(12) United States Patent
Kim

(10) Patent No.: US 9,153,801 B2
(45) Date of Patent: Oct. 6, 2015

(54) RECHARGEABLE BATTERY HAVING A PLATE TERMINAL AND A BOLT TERMINAL

(75) Inventor: Duk-Jung Kim, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 206 days.

(21) Appl. No.: 13/565,063

(22) Filed: Aug. 2, 2012

(65) Prior Publication Data

US 2013/0071726 A1 Mar. 21, 2013

(30) Foreign Application Priority Data

Sep. 16, 2011 (KR) .................. 10-2011-0093665

(51) Int. Cl.
*H01M 2/22* (2006.01)
*H01M 2/30* (2006.01)
*H01M 2/04* (2006.01)
*H01M 2/06* (2006.01)

(52) U.S. Cl.
CPC ............. *H01M 2/043* (2013.01); *H01M 2/06* (2013.01); *H01M 2/305* (2013.01)

(58) Field of Classification Search
CPC ......... H01M 2/02; H01M 2/30; H01M 2/043; H01M 2/305; H01M 2/06
USPC .................. 429/179, 161, 180, 211
See application file for complete search history.

(56) References Cited

U.S. PATENT DOCUMENTS

| | | | | |
|---|---|---|---|---|
| 1,907,420 A | * | 5/1933 | Finn .......................... | 429/160 |
| 3,064,068 A | * | 11/1962 | Fouch ........................ | 429/180 |
| 4,495,260 A | * | 1/1985 | Hardigg et al. ............. | 429/180 |
| 6,296,965 B1 | * | 10/2001 | Azema ....................... | 429/61 |
| 6,819,081 B2 | * | 11/2004 | Izawa et al. ................. | 320/107 |
| 7,029,338 B1 | | 4/2006 | Orange et al. | |
| 2005/0106455 A1 | | 5/2005 | Yoshida et al. | |
| 2006/0051664 A1 | * | 3/2006 | Tasai et al. .................. | 429/161 |
| 2009/0186269 A1 | | 7/2009 | Kim et al. | |
| 2010/0227205 A1 | | 9/2010 | Byun et al. | |
| 2011/0117420 A1 | | 5/2011 | Kim et al. | |

FOREIGN PATENT DOCUMENTS

| | | |
|---|---|---|
| JP | 2001-176495 A | 6/2001 |
| JP | 2001-357834 | 12/2001 |
| JP | 2003-092103 | 3/2003 |
| KR | 10-2007-0014633 A | 2/2007 |

(Continued)

OTHER PUBLICATIONS

Machine Translation of: JP 2001/176495 A, Ono et al., Jun. 29, 2001.*

(Continued)

*Primary Examiner* — Kenneth Douyette

(74) *Attorney, Agent, or Firm* — Lee & Morse, P.C.

(57) ABSTRACT

A rechargeable battery including an electrode assembly; a case including a cavity, the electrode assembly being in the cavity; a cap plate coupled with an opening of the case; and an electrode terminal extending through a terminal hole of the cap plate, the electrode terminal being electrically insulated from the cap plate and electrically connected to the electrode assembly, wherein the electrode terminal includes a plate terminal disposed on an external surface of the cap plate, and a bolt terminal extending at least partially in and being secured to the plate terminal.

13 Claims, 4 Drawing Sheets

(56) References Cited

FOREIGN PATENT DOCUMENTS

| KR | 10-2007-0014657 A | 2/2007 |
| KR | 10-2009-0081197 A | 7/2009 |
| KR | 10-1041153 B1 | 6/2011 |

OTHER PUBLICATIONS

KR Notice of Allowance dated Dec. 6, 2012.
European Search Report Dated Jan. 3, 2013.

* cited by examiner

RECHARGEABLE BATTERY HAVING A PLATE TERMINAL AND A BOLT TERMINAL

BACKGROUND

1. Field

The embodiments relate generally to a rechargeable battery.

2. Description of the Related Art

A rechargeable battery is a battery that is repeatedly charged and discharged, unlike a primary battery. Low-capacity rechargeable batteries may be used for portable compact electronic apparatuses such as mobile phones, notebook computers, and camcorders, and high-capacity rechargeable batteries may be used as a power supply for driving a motor of, e.g., a hybrid vehicle.

The rechargeable battery may include an electrode assembly having electrodes at both sides of a separator, a case in which the electrode assembly is installed, a cap plate coupled to an opening of the case, and an electrode terminal provided in the cap plate and connected to an electrode as a lead tab.

The electrode terminal may include a rivet terminal combined with a terminal hole of the cap plate, a plate terminal connected to the rivet terminal, and a bolt terminal connected to the plate terminal. In this instance, the bolt terminal must be welded on the top surface of the plate terminal. However, when a material of the bolt terminal is different from that of the plate terminal, it is difficult to weld the bolt terminal and the plate terminal.

The above information disclosed in this Background section is only for enhancement of understanding of the background of the described technology and therefore it may contain information that does not form the prior art that is already known in this country to a person of ordinary skill in the art.

SUMMARY

One or more embodiments may provide a rechargeable battery including: an electrode assembly; a case including a cavity, the electrode assembly being in the cavity; a cap plate coupled with an opening of the case; and an electrode terminal extending through a terminal hole of the cap plate, the electrode terminal being electrically insulated from the cap plate and electrically connected to the electrode assembly, wherein the electrode terminal includes a plate terminal on an external surface of the cap plate, and a bolt terminal extending at least partially in and being screwed to the plate terminal.

The plate terminal may include a screw portion, and the bolt terminal may include a first bolt in the screw portion. The screw portion of the plate terminal may include a female thread, and the first bolt may include a male thread. The plate terminal may include a protrusion extending from a center portion of the screw portion and protruding in a direction parallel to a direction in which the screw portion extends, the protrusion supporting the bolt terminal. The plate terminal may include a space between the protrusion and a sidewall of the screw portion. An insulator may be provided between the plate terminal and the cap plate, wherein a portion of the insulator is under the protrusion and the bolt terminal, the portion of the insulator supporting a side of the protrusion.

The bolt terminal may further include a second bolt connected to the first bolt and protruding outside the plate terminal, a diameter of the second bolt being less than a diameter of the first bolt. The plate terminal may include a raised spot when the first bolt is coupled with the screw portion, the raised spot extending above the first bolt. The raised spot may include a rivet to further fasten the first bolt and the plate terminal. A top surface of the first bolt and the raised spot of the plate terminal corresponding in position to the top surface may include a welding bead. The raised spot may further include a groove below an external surface of the plate terminal. The bolt terminal may have a tightening recess on a top surface thereof. The plate terminal and the cap plate may include the same material, and the bolt terminal may include a material different from the material included in the plate terminal. The plate terminal may include aluminum, and the bolt terminal may include aluminum. The plate terminal may include aluminum, and the bolt terminal may include stainless steel.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
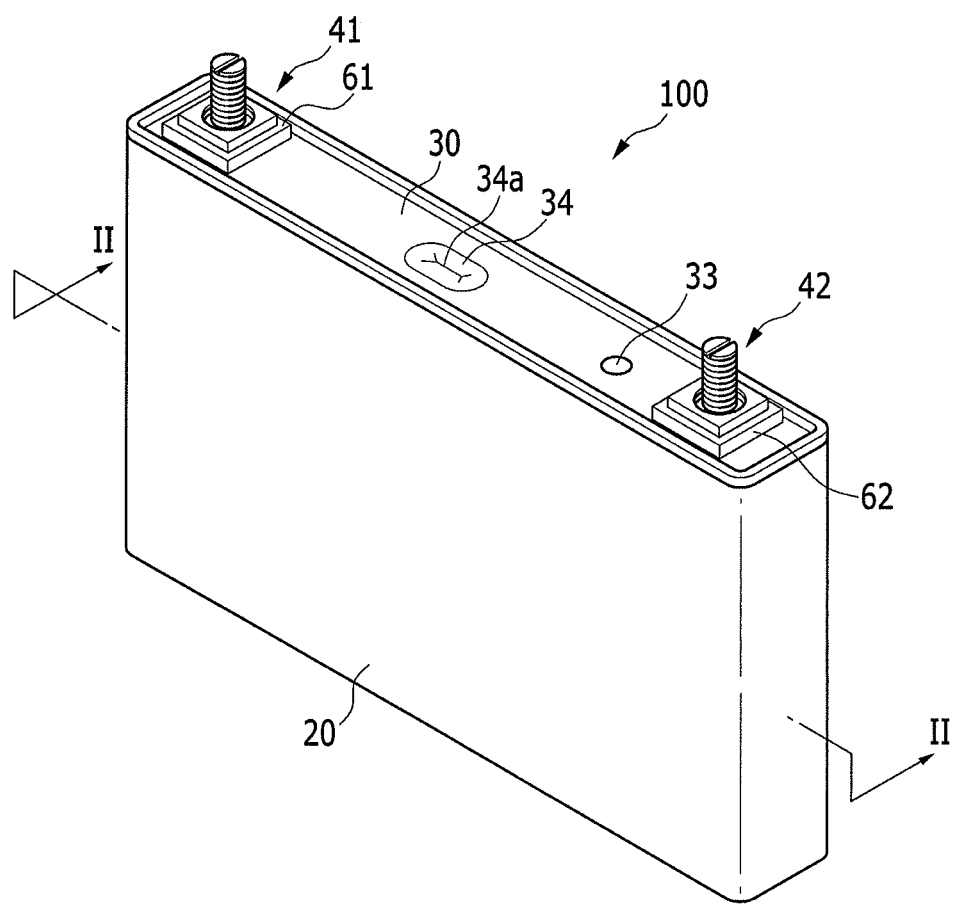
FIG. 1 illustrates a perspective view of a rechargeable battery according to a first exemplary embodiment.

Korean Patent Application No. 10-2011-0093665, filed on Sep. 16, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
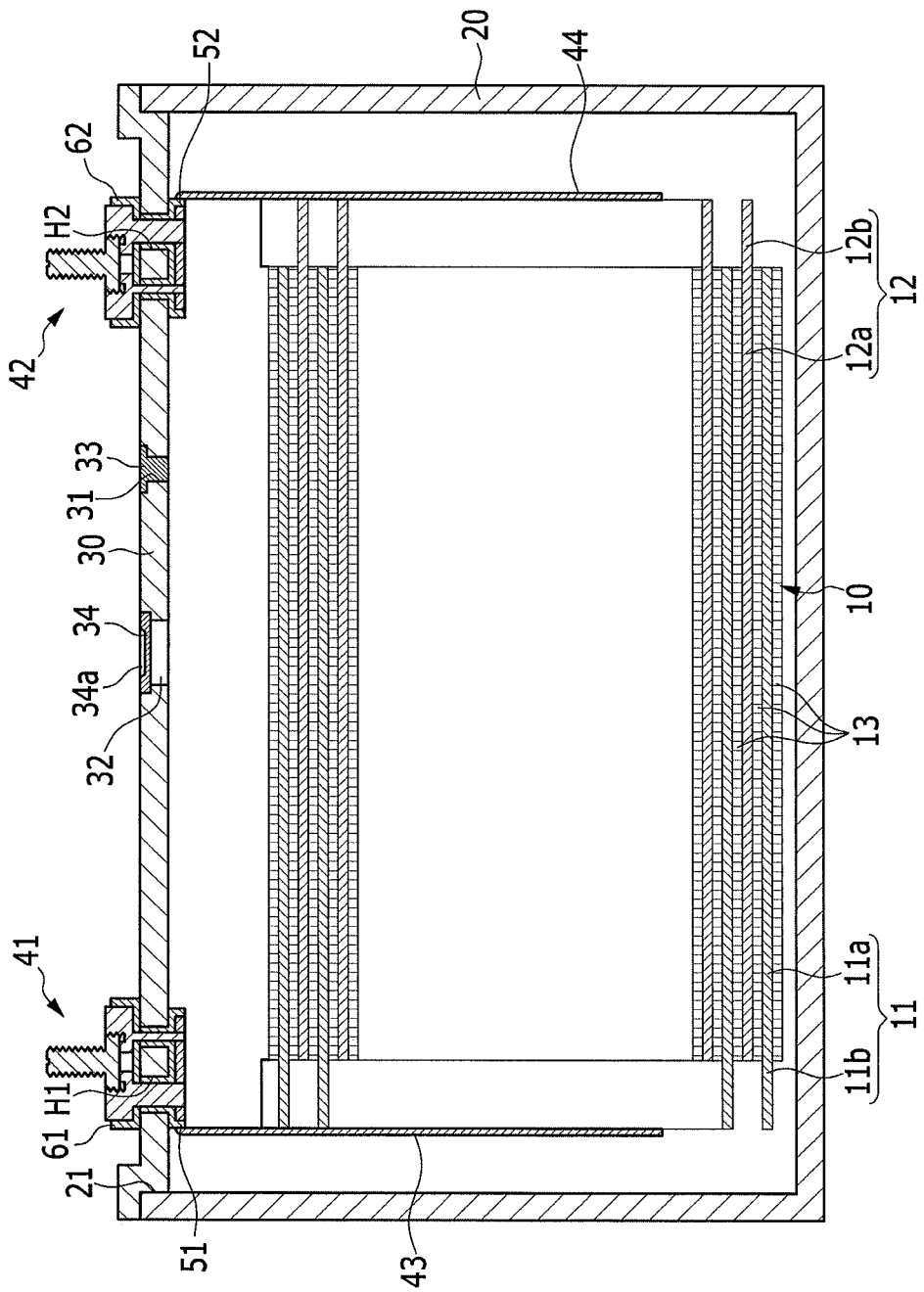
FIG. 2 illustrates a cross-sectional view taken along line II-II of FIG. 1.

FIG. 1 illustrates a perspective view of a rechargeable battery according to a first exemplary embodiment. FIG. 2 illustrates a cross-sectional view taken along line II-II of FIG. 1. Referring to FIGS. 1 and 2, a rechargeable battery 100 according to the first exemplary embodiment may include an electrode assembly 10 which repeatedly performs charging and discharging, a case 20 retaining the electrode assembly 10 and an electrolytic solution, a cap plate 30 coupled with an opening 21 of the case 20, and electrode terminals, including, a negative terminal 41 and a positive electrode terminal 42, which may be installed on the cap plate 30.

In an implementation, the electrode assembly 10 may be formed by disposing electrodes, namely, a negative electrode 11 and a positive electrode 12, on respective sides of a separator 13 that is an electric insulator and winding the stacked negative electrode 11, separator 13, and positive electrode 12 in a jelly roll state.

In addition, the electrode assembly may be assembled by stacking the positive electrode and the negative electrode configured of a single plate, having a separator therebetween, or may be assembled by stacking the negative electrode, the separator, and the positive electrode in a zigzag fashion (not shown).

The negative and positive electrodes 11 and 12 may include coated regions 11a and 12a formed by coating an active material (not shown) on a current collector, and uncoated regions 11b and 12b. The uncoated regions 11b and 12b may include exposed portions of the current collector on which no active material is coated. According to some embodiments, the current collector of the negative electrode 11 may be made of, e.g., a copper thin film, and the current collector of the positive electrode 12 may be made of, e.g., an aluminum thin film.

The uncoated region 11b of the negative electrode 11 may be formed on one end of the negative electrode 11 adjacent the coated region 11a of the spirally wound negative electrode 11. The uncoated region 12b of the positive electrode 12 may be formed on one end of the positive electrode 12 adjacent the coated region 12a of the spirally wound positive electrode 12. According to an implementation, the uncoated regions 11b and 12b may be disposed at opposite ends of the electrode assembly 10 to electrically connect the electrode assembly 10 and the negative and positive electrode terminals 41 and 42.

The case 20 may have the opening 21 formed at one side through which the electrode assembly 10 may be inserted. The opening 21 may have a rectangular parallelepiped shape to facilitate receiving the electrode assembly 10 and the electrolyte solution.

The cap plate 30 may be coupled with the opening 21 of the case 20 to close or seal a retaining space within the case 20. The case 20 and the cap plate 30 may include the same material, e.g., may be aluminum. As such, the case 20 and the cap plate 30 may have an excellent welding property.

The cap plate 30 may include an electrolyte injection opening 31 and a vent hole 32. The electrolyte injection opening 31 may enable injection of the electrolyte solution into the case 20 when the cap plate 30 is coupled to the case 20. After the electrolyte solution is injected, the electrolyte injection opening 31 may be sealed by a sealing cap 33.

The vent hole 32 may be closed and sealed by a vent plate 34, and may discharge internal gas that is generated by charging and discharging to the outside of the rechargeable battery so as to prevent explosion of the rechargeable battery. For example, when internal pressure of the rechargeable battery reaches a predetermined value, the vent plate 34 may be incised. The vent plate 34 may have a notch 34a to facilitate incision of the vent plate 34.

The cap plate 30 may include terminal holes H1 and H2 for electrically connecting the inside and the outside of the case 20, e.g., connecting components with the case 20 to components outside of the case 20. The electrode terminals, e.g., the negative and positive electrode terminals 41 and 42, may be respectively installed in the terminal holes H1 and H2 of the cap plate 30. The negative and positive electrode terminals 41 and 42 may be connected to the electrode assembly 10 by lead tabs, e.g., negative and positive electrode lead tabs 43 and 44.

According to some embodiments, the negative terminal 41 may be conductively connected to the negative electrode 11 of the electrode assembly 10 by the negative electrode lead tab 43, and the positive electrode terminal 42 may be conductively connected to the positive electrode 12 of the electrode assembly 10 by the positive electrode lead tab 44.

The rechargeable battery may include insulators 61 and 62 that are respectively provided between the negative and positive electrode terminals 41 and 42 and an external surface of the cap plate 30 for electrically insulating the negative and positive electrode terminals 41 and 42. Gaskets 51 and 52 may be provided between an inner surface of the cap plate 30 and the negative and positive electrode terminals 41 and 42, respectively, to electrically insulate the negative and positive electrode terminals 41 and 42, and seal a gap between the cap plate 30 and the negative and positive electrode terminals 41 and 42. The gaskets 51 and 52 may be inserted into the terminal holes H1 and H2 to further electrically insulate the negative and positive electrode terminals 41 and 42 from the cap plate 30.

The negative and positive electrode terminals 41 and 42 may be coupled to the terminal holes H1 and H2 in a like manner, so for convenience of description, a description of the connection between the negative terminal 41 and the terminal hole H1 will not be repeated. A description of the connection between the positive electrode terminal 42 and the terminal hole H2 is provided below.

Figure 3:
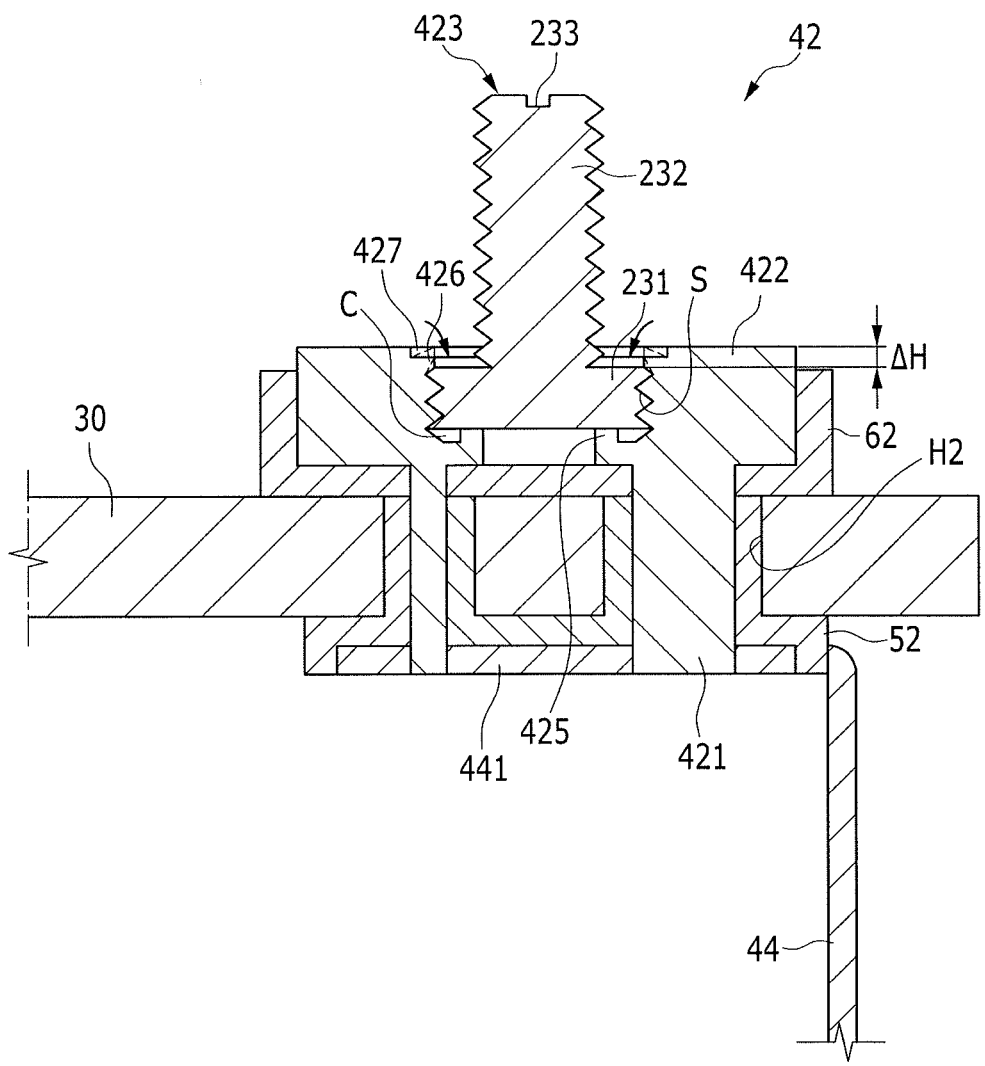
FIG. 3 illustrates a detailed cross-sectional view of an assembled part of a cap plate and a positive electrode terminal.

FIG. 3 illustrates a detailed cross-sectional view of an assembled part of a cap plate 30 and a positive electrode terminal 42. Referring to FIG. 3, the positive electrode terminal 42 may include a plate terminal 422, a rivet terminal 421 formed inside the plate terminal 422, and a bolt terminal 423 formed outside the plate terminal 422.

The plate terminal 422 may include the insulator 62 and may be disposed outside the cap plate 30. The plate terminal 422 may be electrically insulated from the cap plate 30 by the insulator 62. The rivet terminal 421 may be integrally formed with the plate terminal 422, and the bolt terminal 423 may be screwed into the plate terminal 422.

The rivet terminal 421 may be inserted into the terminal hole H2 of the cap plate 30, and connect the inside and the outside of the cap plate 30. For example, the rivet terminal 421 may include a first portion that is outside of the case 20 and a second portion that is within the case 20. Also, the rivet terminal 421 may be electrically insulated from the cap plate 30 by the gasket 52, and may be electrically connected to the positive electrode lead tab 44.

The positive electrode lead tab 44 may include the same material that may in the rivet terminal 421, e.g., may be aluminum. A bonded part 441 may be inserted into the bottom of the rivet terminal 421, e.g., within a groove in a bottom surface of the rivet terminal 421, to caulk the bottom of the rivet terminal 421 and electrically connect the bonded part 441 to the positive electrode terminal 42.

The bolt terminal 423 may be screwed into the plate terminal 422 to draw the positive electrode 12 of the electrode assembly 10 outside the case 20. For example, the positive electrode 12 of the electrode assembly 10 may be electrically connected to the bolt terminal 423 via the positive electrode lead tab 44, the rivet terminal 421, and the plate terminal 422.

The plate terminal 422 may include a screw portion (S), and the bolt terminal 423 may include a first bolt 231 screwed into the screw portion (S). The screw portion may be an opening in the plate terminal 422 in which the first bolt 231 may be retained. In the first exemplary embodiment, a sidewall of the screw portion (S) may include a female thread and the first bolt 231 may be formed to have a male thread for engaging the female thread of the screw portion (S).

The plate terminal 422 may include a protrusion 425 extending from a center portion of the screw portion (S) toward a top surface of the plate terminal 422. The protrusion 425 may protrude in a direction parallel to the direction in which the screw portion (S) extends. For example, the protrusion 425 may extend into the screw portion (S) and may support the bolt terminal 423 once the bolt terminal 423 is coupled with the screw portion (S). Accordingly, the plate terminal 422 may be electrically connected to the first bolt 231 of the bolt terminal 423 through the protrusion 425 and the screw portion (S).

The plate terminal 422 may include a space (C) between the protrusion 425 and the sidewall of the screw portion (S). The space (C) may facilitate contact between the bolt terminal 423 and the protrusion 425 once the first bolt 231 is screwed in the screw portion (S).

The insulator 62 may include a portion that is under the protrusion 425 and the bolt terminal 423, to support a side, e.g., the bottom side, of the protrusion 425 and to electrically insulate the protrusion 425 of the plate terminal 422 from the cap plate 30. For example, the portion of the insulator 62 may be between the protrusion 425 and the cap plate 30. The insulator 62 may include a second portion that seals the terminal hole H2 and a gap inside the screw portion (S) of the plate terminal 422.

The bolt terminal 423 may have a portion with a diameter that is less than the diameter of the first bolt 231. The bolt terminal 423 may include a second bolt 232 connected to the first bolt 231. The second bolt 232 may have a diameter that is less than the diameter of the first bolt 231. The first bolt 231 may be screwed into the screw portion (S) of the plate terminal 422. The second bolt 232 may have a tightening recess 233 on a top surface thereof to facilitate screwing of the first bolt 231.

In an implementation, the tightening recess 233 may be formed on the top surface of the bolt terminal 423 to facilitate fastening of the bolt terminal 423 to the plate terminal 42 by use of a tool such as a driver. The tightening recess 233 may be an indentation in the top surface of the bolt terminal 423 in the shape of a minus (−) sign or a plus (+) sign, or the indentation may have a hexagonal shape.

The second bolt 232 may protrude outside the plate terminal 422 and may be coupled with a nut (not shown) and a bus bar (not shown) when a plurality of neighboring rechargeable batteries are connected in series or parallel.

The plate terminal 422 may include a raised spot 426 protruding from an outermost side of the screw portion (S) and having a height (ΔH) which may measured from a top surface of the first bolt 231 and an angle with the top surface of the first bolt 231. As shown FIG. 3, the raised spot 426 may be deformed when the first bolt 231 is coupled with the screw portion (S) of the plate terminal 422. For example, once the first bolt 231 is screwed into the screw portion (S), the raised spot 426 may be riveted to fasten together the plate terminal 422 and the bolt terminal 423. Therefore, fastening of the plate terminal 422 and the bolt terminal 423 may be further improved. The first bolt 231 may be further secured within the screw portion (S) by tightening the first bolt 231 within the screw portion (S).

The raised spot 426 may further include a groove 427 below the external, i.e., top, surface of the plate terminal 422. A bus bar (not shown) may be installed in the groove 427 in the plate terminal 422 and a nut (not shown) may be fastened to the second bolt 232. As such, the bus bar may be level with a top surface of the plate terminal 422.

According to some embodiments, the plate terminal 422 may be made with the same material included in the cap plate 30, e.g., may be aluminum. According to some embodiments, the rivet terminal 421 coupled to the plate terminal 422 may also include the same material, e.g., may be aluminum. The bolt terminal 423 may include a material that is different from that of the plate terminal 422.

According to some embodiments, the plate terminal 422 may include aluminum and the bolt terminal 423 may include stainless steel. According to some embodiments, the plate terminal 422 and the rivet terminal 421 may be stably connected to the positive electrode lead tab 44. According to some embodiments, the bolt terminal 423, connected to the bus bar, may include a material having high rigidity, e.g., stainless steel. As such, the positive electrode terminal 42 may have great mechanical strength.

A second exemplary embodiment is described below, with reference to FIG. 4. Descriptions of the same configurations as the first exemplary embodiment will be omitted.

Figure 4:
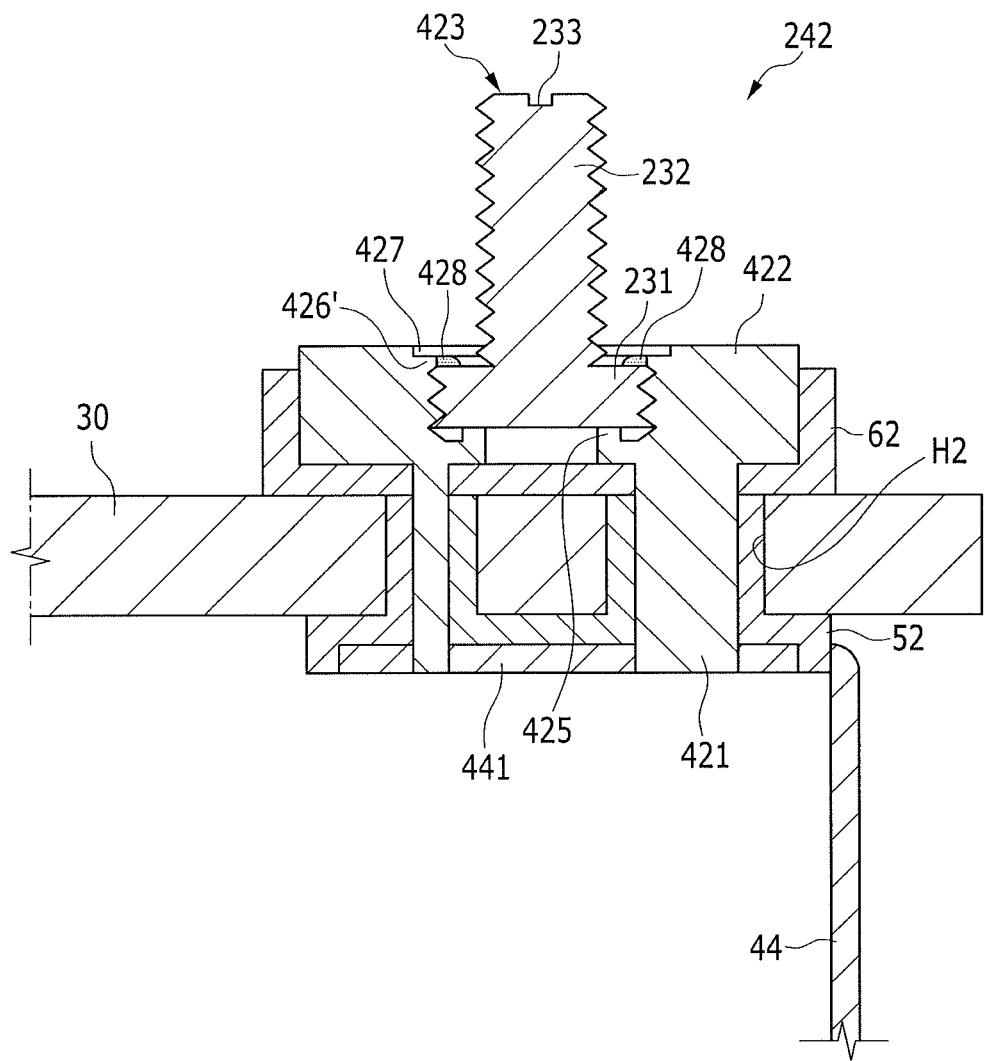
FIG. 4 illustrates a detailed cross-sectional view of an assembled part of a cap plate and a positive electrode terminal in a rechargeable battery according to a second exemplary embodiment.

FIG. 4 illustrates a detailed cross-sectional view of an assembled part of a cap plate 30 and a positive electrode terminal 242 in a rechargeable battery according to a second exemplary embodiment. Referring to FIG. 4, according to some embodiments, the plate terminal 422 and the bolt terminal 423 may both include aluminum.

A top surface of the first bolt 231 may be welded with a corresponding surface of the raised spot 426' of the plate terminal 422. For example, a welding bead 428 may be formed inside the raised spot 426' and on the top surface of the first bolt 231 to secure together the raised spot 426' and the first bolt 231.

The first bolt 231 and the plate terminal 422 may be made with the same material. As such, welding of the first bolt 231 and the plate terminal 422 may be improved. Fastening of the bolt terminal 423 to the plate terminal 422 may be reinforced by the welding.

The welding bead 428 may be formed without occupying the groove 427 of the plate terminal 422. As such, the shape, e.g., groove shape, of the groove 427 may be maintained to facilitate stable installation of the bus bar therein.

By way of summation and review, the embodiments may provide a rechargeable battery having an electrode terminal for fastening a plate terminal and a bolt terminal. The plate terminal and bolt terminal of the rechargeable battery may be easily fastened at an electrode terminal. By screwing the bolt terminal, fastening of the plate terminal and the bolt terminal is facilitated. The fastened plate terminal and bolt terminal may be further secured at the electrode terminal and rigidity of the electrode terminal connected to a bus bar may be reinforced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly;
a case including a cavity, the electrode assembly being in the cavity;
a cap plate coupled with an opening of the case; and
an electrode terminal extending through a terminal hole of the cap plate, the electrode terminal being electrically insulated from the cap plate and electrically connected to the electrode assembly, wherein the electrode terminal includes
a plate terminal on an external surface of the cap plate and including a screw portion, and
a bolt terminal including a first bolt extending at least partially in and being screwed to the screw portion of the plate terminal, the bolt terminal further including a second bolt connected to the first bolt and protruding outside the plate terminal and outside the rechargeable battery, a diameter of the second bolt being less than a diameter of the first bolt, wherein the plate terminal includes a raised spot that is deformed when the first bolt is coupled with the screw portion, the raised spot extending above the first bolt, and wherein the raised spot includes a rivet to further fasten the first bolt and the plate terminal.

2. The rechargeable battery as claimed in claim 1, wherein the screw portion of the plate terminal includes a female thread, and
the first bolt includes a male thread.

3. The rechargeable battery as claimed in claim 2, wherein the plate terminal includes
a protrusion extending from a center portion of the screw portion and protruding in a direction parallel to a direction in which the screw portion extends, the protrusion supporting the bolt terminal.

4. The rechargeable battery as claimed in claim 3, wherein the plate terminal includes a space between the protrusion and a sidewall of the screw portion.

5. The rechargeable battery as claimed in claim 3, further including
an insulator between the plate terminal and the cap plate, wherein
a portion of the insulator is under the protrusion and the bolt terminal, the portion of the insulator supporting a side of the protrusion.

6. The rechargeable battery as claimed in claim 1, wherein a top surface of the first bolt and the raised spot of the plate terminal corresponding in position to the top surface include a welding bead.

7. The rechargeable battery as claimed in claim 1, wherein the raised spot further includes a groove below an external surface of the plate terminal.

8. The rechargeable battery as claimed in claim 1, wherein the bolt terminal has a tightening recess on a top surface thereof.

9. The rechargeable battery as claimed in claim 1, wherein the plate terminal and the cap plate include the same material, and
the bolt terminal includes a material different from the material included in the plate terminal.

10. The rechargeable battery as claimed in claim 1, wherein the plate terminal includes aluminum, and
the bolt terminal includes aluminum.

11. The rechargeable battery as claimed in claim 1, wherein the plate terminal includes aluminum, and
the bolt terminal includes stainless steel.

12. A rechargeable battery, comprising:
a case;
an electrode assembly in the case;
a cap plate coupled with the case; and
an electrode terminal extending through a terminal hole of the cap plate, the electrode terminal being electrically insulated from the cap plate and electrically connected to the electrode assembly, the electrode terminal including:
a plate terminal on an external surface of the cap plate and including a screw portion, and
a bolt terminal including a first bolt extending at least partially in and being screwed to the screw portion of the plate terminal, the bolt terminal further including a second bolt connected to the first bolt and protruding outside the plate terminal and outside the rechargeable battery, a diameter of the second bolt being less than a diameter of the first bolt, the plate terminal including a raised spot that is deformed when the first bolt is coupled with the screw portion, the raised spot extending above the first bolt, and the raised spot further including a bus bar receiving groove below an external surface of the plate terminal.

13. A rechargeable battery, comprising:
an electrode assembly;
a case including a cavity, the electrode assembly being in the cavity;
a cap plate coupled with an opening of the case; and
an electrode terminal extending through a terminal hole of the cap plate, the electrode terminal being electrically insulated from the cap plate and electrically connected to the electrode assembly, wherein the electrode terminal includes
a plate terminal on an external surface of the cap plate and including a screw portion, and
a bolt terminal including a first bolt extending at least partially in and being screwed to the screw portion of the plate terminal, the bolt terminal further including a second bolt connected to the first bolt and protruding outside the plate terminal and outside the rechargeable battery, a diameter of the second bolt being less than a diameter of the first bolt, wherein the plate terminal includes a raised spot that is deformed when the first bolt is coupled with the screw portion, the raised spot extending above the first bolt.

* * * * *